Patented Mar. 14, 1950

2,500,517

UNITED STATES PATENT OFFICE 2,500,517

CURING BUTADIENE COPOLYMERS

Thomas S. Carswell, Seattle, Wash., assignor to Monsanto Chemical Company, St. Louis, Mo., a corporation of Delaware No Drawing. Application June 14, 1945, Serial No. 599,511

7 Claims. (Cl. 260—45.2)

The present invention relates to improvements in the compounding and curing of vulcanizable rubbery co-polymers of butadiene-1,3 hydrocarbons and organic nitriles and more particularly to the treatment of such co-polymers with organic compounds having an active methylene group linked to oxygen and to the new compositions of matter obtained thereby.

In accordance with the present invention it has been discovered that organic compounds having an active methylene group linked to oxygen are valuable adjuvants in the compounding and curing of vulcanizable rubbery co-polymers of butadiene-1,3 hydrocarbons and organic nitriles. For example, cure may be effected without sulfur by heating the rubbery co-polymers in the presence of the active methylene compound. In some instances the active methylene compound can be used as a combination plasticizer and curing agent or it may be used in conjunction with sulfur.

One class of compounds containing active methylene groups linked to oxygen can be prepared by the addition of formaldehyde to organic compounds. A wide variety of active methylene compounds can be prepared by this reaction. For example, dimethylol urea can be prepared by reacting substantially one molecular proportion of urea and substantially two molecular proportions of formaldehyde according to the method of Dixon, Journal of the Chemical Society 113, 247 (1918) wherein a mixture of the reactants is just neutralized with dilute alkali hydroxide, and allowed to stand for a day or two at room temperature. Formaldehyde also reacts with phenols forming methylol compounds. The preparation of o,o' dimethylol-p-cresol is described in Berichte der Deutschen Chemischen Gesellschaft, vol. 40, page 2532 (1907). The procedure consists in adding formaldehyde to a solution of p-cresol in aqueous caustic alkali, letting the mixture stand several days and saturating with carbon dioxide whereby the free acid is precipitated. The pure compound melts at 133–134° C. Formaldehyde also adds to 2-mercaptobenzothiazole as described in United States Patent No. 1,960,197, granted to Zimmermann. Both the free methylol compounds and ethers thereof may be used in the practice of the present invention.

An important group of compounds useful for the purposes of this invention are methylol derivatives of melamine and ethers thereof. These may be prepared in known manner by reacting melamine with formaldehyde or with formaldehyde and an alcohol, generally a monohydric alcohol. Preparation of these products is described in United States Patent No. 2,311,911, granted to Swain et al. According to one embodiment of the preparation, ethers are prepared by reacting formaldehyde and melamine to produce an intermediate reaction product and the resulting product is then reacted with a monohydric alcohol. Examples of methylol melamines are the mono-, di-, tri-, tetra-, penta-, and hexa-, methylol melamines and mixtures of these. Condensation products of the methylol melamines are also suitable in the practice of this invention. The extent of the condensation of the methylol compounds depends upon the temperature at which the reaction is carried out and on the duration of the reaction. The number of methyl groups depends primarily on the molecular ratio of the formaldehyde reacted with melamine. While, as indicated, resinous condensation products of methylol compounds are suitable the reaction should not be allowed to progress so far as to destroy all the active methylene groups. Infusible, insoluble condensation products do not exhibit the desirable characteristics of compounds having active methylene groups and should be avoided.

As an example of one method by which ethers of methylol melamines may be prepared, melamine and formaldehyde are reacted in the desired molecular ratio, for example, 4 mols of formaldehyde in an aqueous 37% solution for each mol of melamine, in the presence of sufficient sodium hydroxide to produce initially a pH of 9.3 (glass electrode). The reaction is carried out with agitation at atmospheric pressure at 80–90° C. As soon as the mixture becomes clear, indicating that the melamine has reacted, it is diluted with an equal volume of water and allowed to cool. On cooling a crystalline product is formed which is separated by filtration. The product is essentially tetra methylol melamine.

The tetra methylol melamine is treated with ethyl alcohol in substantial excess of the amount needed to react with all of the methylol groups. The reaction is carried out at about 40° C. after the addition of sufficient phosphoric acid to produce a pH of about 4–5. The reaction is continued until a clear solution is formed and thereafter the pH of the solution is adjusted to about 8.3 (phenolphthalein indicator) by the addition of sodium hydroxide. Then the solution is cooled to about 25° C. to precipitate the sodium phosphate which is filtered off and the filtrate is concentrated by vacuum distillation to the desired solids content, for example, about 70% solids. The resulting product comprises essentially an alcohol paste or slurry of the tetra ethyl ether of tetra methylol melamine.

The product prepared as described is a valuable curing agent for co-polymers of butadiene- 1,3 and acrylic nitrile. In using it for this purpose the remaining liquid may be removed just prior to addition to the co-polymer or the paste or slurry may be added to the co-polymer directly and the liquid evaporated from the rubbery mass by milling on a warm mill.

The following are specific embodiments of the invention describing it in detail but are not to be taken as limitative thereof.

A stock was compounded comprising

|  | Parts by weight |
|---|---|
| Hycar OR-15[1] | 100 |
| Carbon black | 50 |
| Zinc oxide | 5 |
| 2,2' dithio bis benzothiazole | 1.5 |
| The cured product was then artificially aged by mine | 10 |

[1] Co-polymer of butadiene-1,3 and acrylonitrile.

The composition so prepared was cured by heating in the usual manner in a press at 142° C. The cured product was then artificially aged by heating for 24 hours in an oven in circulating air at 100° C. The physical properties before and after aging are set forth below:

Table I

| Cure Time in Mins. | Unaged | | | Aged | | |
|---|---|---|---|---|---|---|
|  | Modulus of Elasticity at 300% Elongation in lbs./in.² | Tensile at Break in lbs./in.² | Ult. Elong., Per Cent | Modulus of Elasticity at 300% Elongation in lbs./in.² | Tensile at Break in lbs./in.² | Ult. Elong., Per Cent |
| 60 | 1,260 | 3,610 | 450 | 1,075 | 3,770 | 560 |
| 90 | 735 | 2,280 | 450 | 1,225 | 3,710 | 520 |

It will be seen that very excellent modulus and tensile properties were obtained by use of etherified methylol melamines as curing agents and that the stocks retain their desirable properties remarkably well after aging.

Excellent resistance to aging is further illustrated by the results obtained with stocks comprising

|  | Stock | |
|---|---|---|
|  | A | B |
|  | Parts by weight | Parts by weight |
| Hycar OR-15 | 100 | 100 |
| Carbon black | 50 | 50 |
| Zinc oxide | 5 | 5 |
| N-Cyclohexyl 2-benzothiazole sulfenamide | 1.5 | 1.5 |
| Butyl ether of tetra methylol melamine | 7.1 |  |
| Partially ethylated tetra methylol melamine |  | 6.7 |

These stocks were cured by heating for 120 minutes in a press at 150° C. and the cured products artificially aged by heating 24 hours in an oven in circulating air at 150° C.

Table II

| Stock | Unaged | | | Aged | | |
|---|---|---|---|---|---|---|
|  | Modulus of Elasticity at 300% Elongation in lbs./in.² | Tensile at Break in lbs./in.² | Ult. Elong., Per Cent | Modulus of Elasticity at 300% Elongation in lbs./in.² | Tensile at Break in lbs./in.² | Ult. Elong., Per Cent |
| A | 580 | 1,200 | 550 | 2,370 | 2,370 | 300 |
| B | 760 | 1,810 | 700 | 2,300 | 2,850 | 390 |

These results again show surprising resistance to aging of stocks cured with methylol melamine ethers even under the severe aging conditions imposed by the 150° C. temperature. While a similar stock containing 1.5 parts by weight of sulfur and 20 parts of dibutyl sebacate in place of the methylol melamine ether gave higher original tensiles, the tensile strength after aging was substantially less than that of the stocks cured with the methylol melamine ethers and the ultimate elongation was less than half that of the A and B stocks above.

The amount of methylol melamine or ether thereof can be varied widely. While amounts on the order of 2% on the co-polymer are usually sufficient, much larger amounts can be used where desired. These methylol melamine ethers have marked plasticizing activity and are advantageously used to improve the processibility of the stocks. They reduce the time required to add pigments, reduce shrinkage and give smooth stocks. The addition of sulfur for vulcanization is unnecessary and sulfur is in fact preferably left out, since better aging characteristics result thereby. Stock D below illustrates the dual function of plasticizer and curing agent and is shown in comparison with a sulfur vulcanized stock. An alcoholic paste or slurry of the ether was acidified with formic acid to a pH of 6 (Hydrion paper) and added to the co-polymer in slurry form. Milling was done in normal manner except that the rolls were kept at 80-90° C. to drive off the solvent. Vulcanizable stocks were compounded comprising

|  | Stock | |
|---|---|---|
|  | C | D |
|  | Parts by weight | Parts by weight |
| Hycar OR-15 | 100 | 100 |
| Carbon black | 50 | 50 |
| Zinc oxide | 5 | 5 |
| Stearic acid | 1.5 | 1.5 |
| N-Cyclohexyl 2-benzothiazole sulfenamide | 1.5 |  |
| Sulfur | 1.5 |  |
| Dibutyl Sebacate | 20 |  |
| Partially ethylated tetra methylol melamine |  | 26.8 |
| 2,2' dithio bis benzothiazole |  | 1.5 |
| Litharge |  | 2.0 |

Vulcanization was effected in the usual manner by heating in a press for different periods of time at 150° C. The cured products were then artificially aged by heating for 24 hours in an oven in circulating air at 150° C.

Table III

| Stock | Cure Time in Mins. | Unaged | | | Aged | | |
|---|---|---|---|---|---|---|---|
| | | Modulus of Elasticity at 300% Elongation in lbs./in.² | Tensile at Break in lbs./in.² | Ult. Elong., Percent | Modulus of Elasticity at 300% Elongation in lbs./in.² | Tensile at Break in lbs./in.² | Ult. Elong., Percent |
| C | 90 | 1,370 | 2,780 | 550 | | 1,265 | 115 |
| D | 90 | 1,420 | 2,000 | 500 | | 1,905 | 200 |
| C | 120 | 1,510 | 2,930 | 530 | | 1,460 | 115 |
| D | 120 | 1,440 | 2,070 | 500 | | 2,100 | 230 |

The ether dispersed into the co-polymer very readily so that the stock was milled in a much shorter time than the control stock. The modulus and elongation of the unaged stock, as shown by the above data, were quite comparable to the control stock and after aging the advantage over sulfur vulcanization is striking.

While best results with the active methylene compounds are usually obtained by using an accelerator of vulcanization and a metallic activator as for example, zinc oxide or litharge, in conjunction with the vulcanizing agent, neither of these is essential for vulcanization. A mixture of the co-polymer and methylene compound or a mixture of the co-polymer, a reinforcing pigment like carbon black and an active methylene compound will cure upon heating. For example, stocks were compounded comprising

| | Stock | |
|---|---|---|
| | E | F |
| | Parts by weight | Parts by weight |
| Hycar OR-15 | 100 | 100 |
| Carbon black | 50 | 50 |
| Butyl ether of hexa methylol melamine | 2 | |
| Methylol thio benzothiazole | | 2 |

The compositions were cured in the usual manner by heating in a press for different periods of time at 142° C. and then aged by heating for 24 hours in an oven in circulating air at 100° C. The physical properties of the aged and unaged cured products are set forth below:

Table IV

| Stock | Cure Time in Mins. | Unaged | | | Aged | | |
|---|---|---|---|---|---|---|---|
| | | Modulus of Elasticity at 300% Elongation in lbs./in.² | Tensile at Break in lbs./in.² | Ult. Elong., Per Cent | Modulus of Elasticity at 300% Elongation in lbs./in.² | Tensile at Break in lbs./in.² | Ult. Elong., Per Cent |
| E | 60 | 575 | 1,135 | 700 | | 2,315 | 250 |
| F | 60 | 315 | 1,160 | 1,200 | 440 | 2,080 | 800 |
| E | 90 | 675 | 1,190 | 650 | | 2,905 | 290 |
| F | 90 | 280 | 1,415 | 1,130 | 375 | 2,240 | 830 |

It is thus apparent that the excellent aging characteristics of stocks cured with active methylene compounds are exhibited in the absence of accelerator and metallic activator as well as in their presence.

Included within the scope of this invention are ethers of aminotriazine-formaldehyde reaction products in which the residues of the alcohols or other substances employed in preparing the ethers vary widely. As examples of ether forming radicles may be mentioned ethyl, chlor ethyl propyl, chlor propyl butyl, chlor butyl amyl, chlor amyl phenyl, benzyl, toluyl, lauryl, cetyl, allyl, oleyl, furfuryl, cyclohexyl and the like. When the ethers are made from alcohols, monohydric or polyhydric alcohols or mixtures thereof may be employed. Examples of such alcohols are methyl alcohol, ethyl alcohol, propyl alcohol, butyl alcohol, ethyl butanol, ethyl hexanol, lauryl alcohol, stearyl alcohol, benzyl alcohol, ethylene glycol, diethylene glycol, glycerol, sorbitol, terpineol, furfuryl alcohol and the like.

Of course other triazines than melamine are capable of reacting with formaldehyde forming methylol compounds. These include substituted melamines, for example, chlorinated, alkylated or phenylated melamines, deaminated melamines as for example ammeline and amelide, condensed triazines as for example melam and melem. Methylol compounds of these or ethers thereof may be used in the practice of this invention.

Amino triazines, albeit important, are by no means the only group of compounds capable of forming methylol derivatives. Apparently the nature of the rest of the molecule is not critical. In order for a compound to exhibit vulcanizing activity it is simply necessary that an active methylene linked to oxygen be present. Naturally, the manner in which the compounds are prepared is not significant but since the methylene group in methylol compounds which may be regarded as formaldehyde addition products is invariably an active methylene group and renders the hydroxy group very much more reactive than an ordinary alcohol, the new adjuvants are conveniently referred to as formaldehyde addition products and ethers thereof. Dimethylol urea or thiourea and dimethylol cresol are well known examples of active methylol compounds. As illustrative of the reactivity of these compounds, both form ethers simply by heating with an excess of an alcohol. The activity of the butyl ethers is illustrated by the following specific embodiments of the invention.

Stocks were compounded from the rubbery co-polymer of butadiene-1,3 and acrylonitrile having the composition indicated in the formula below and cured by heating in a press at 142° C. The cured products were then aged by heating for 24 hours in an oven in circulating air at 100° C.

|  | Stock | |
|---|---|---|
|  | J | K |
|  | Parts by weight | Parts by weight |
| Hycar OR-15 | 100 | 100 |
| Carbon black | 50 | 50 |
| Zinc oxide | 3 | 3 |
| Mercaptobenzothiazole | 1.5 | 1.5 |
| Butyl ether of dimethylol urea | 2 |  |
| Butyl ether of o,o'dimethylol-p-cresol |  | 2 |

Table V

| Stock | Cure Time in Mins. | Unaged | | | Aged | | |
|---|---|---|---|---|---|---|---|
|  |  | Modulus of Elasticity at 300% Elongation in lbs./in.$^2$ | Tensile at Break lbs./in.$^2$ | Ult. Elong., Per Cent | Modulus of Elasticity at 300% Elongation in lbs./in.$^2$ | Tensile at Break lbs./in.$^2$ | Ult. Elong., Per Cent |
| J | 60 | 460 | 1,445 | 875 | 2,120 | 3,900 | 445 |
| K | 60 | 570 | 1,485 | 780 | 2,945 | 3,205 | 340 |
| J | 90 | 620 | 1,705 | 740 | 2,090 | 3,340 | 395 |
| K | 90 | 665 | 1,830 | 725 | 2,680 | 3,480 | 370 |

It will be noted that two percent of the active methylene compound brought about cure and produced cured products of good age resisting characteristics.

Sulfur liberating compounds are sometimes employed as vulcanizing agents in place of free sulfur and the example below illustrates the effectiveness of the new adjuvants as compared to a control vulcanized with a sulfur compound. The stocks were cured by heating for ninety minutes in a press at 150° C. and then aged 48 hours in circulating air at 150° C.

|  | Stock | |
|---|---|---|
|  | L | M |
|  | Parts by weight | Parts by weight |
| Hycar OR-15 | 100 | 100 |
| Carbon black | 50 | 50 |
| N-Cyclohexyl 2-benzothiazole sulfonamide | 2 |  |
| Litharge | 3 | 2.5 |
| Dibutyl sebacate |  | 20 |
| Tetra methyl thiuram disulfide |  | 2.5 |
| Zinc dimethyl dithiocarbamate |  | 2.5 |
| Methylol methyl ethyl ketone | 5 |  |

Table VI

| Stock | Modulus of Elasticity at 300% Elongation in lbs./in.$^2$ | Tensile at Break in lbs./in.$^2$ | Ult. Elong., Per Cent | Tensile After aging, lbs./in.$^2$ | Ult. Elong. After aging, Per Cent |
|---|---|---|---|---|---|
| L | 565 | 2,160 | 900 | 1,815 | 200 |
| M | 795 | 2,150 | 670 | 1,290 | 125 |

The data show that heating in the presence of compounds having active methylene groups produced cured products having tensile properties comparable to those obtained by use of sulfur liberating compounds and that the tensile properties hold up better under severe aging conditions.

While many specific embodiments of the invention have been described, it will be apparent that many variations and modifications can be made, all of which are within the spirit and scope of the present invention. This invention relates generally to the formation of heat converted compositions by incorporating active methylene compounds into rubber co-polymers of butadiene and organic nitriles. While the plastic properties of the co-polymers are desirable to facilitate processing, reduction of the plastic properties and formation of strong elastic bodies is desirable for use. The change in properties is effected by means of active methylene compounds and this invention is not limited to any theories as to whether the effect is due to mechanical bonding, chemical bonding or both. The present invention is not limited except as defined by the claims attached hereto as part of the present specification.

What is claimed is:

1. The process of curing a sulfur vulcanizable rubbery co-polymer of butadiene-1,3 and acrylonitrile which comprises heating the co-polymer without sulfur in the presence of at least 2% on the copolymer of an ether of a methylol compound comprising a formaldehyde addition product of an amino 1,3,5-triazine.

2. The process of curing a sulfur vulcanizable rubbery co-polymer of butadiene-1,3 and acrylonitrile which comprises heating the co-polymer without sulfur in the presence of at least 2% on the copolymer of an ether of a methylol derivative comprising a formaldehyde addition product of melamine.

3. The process of curing a sulfur vulcanizable rubbery co-polymer of butadiene-1,3 and acrylonitrile which comprises heating the co-polymer without sulfur in the presence of at least 2% on the copolymer of an ether of methylol melamine.

4. The process of curing a sulfur vulcanizable rubbery co-polymer of butadiene-1,3 and acrylonitrile which comprises heating the co-polymer without sulfur in the presence of at least 2% on the copolymer of an alkyl ether of tetra methylol melamine.

5. The process of curing a sulfur vulcanizable rubbery co-polymer of butadiene-1,3 and acrylonitrile which comprises heating the co-polymer without sulfur in the presence of at least 2% on the copolymer of the butyl ether of tetra methylol melamine.

6. The cured product obtained by heating a sulfur vulcanizable rubbery co-polymer of butadiene-1,3 and acrylonitrile without sulfur in the presence of at least 2% on the copolymer of an ether of a methylol compound comprising a formaldehyde addition product of an amino 1,3,5-triazine.

7. The cured product obtained by heating a sulfur vulcanizable rubbery co-polymer of butadiene-1,3 and acrylonitrile without sulfur in the presence of at least 2% on the copolymer of the butyl ether of tetra methylol melamine.

THOMAS S. CARSWELL.

REFERENCES CITED

The following references are of record in the file of this patent:

UNITED STATES PATENTS

| Number | Name | Date |
|---|---|---|
| 2,277,941 | Almy | Mar. 31, 1942 |

OTHER REFERENCES

Ser. No. 357,662, Wildschut (A. P. C.), published April 20, 1943.